Feb. 6, 1968     I. W. DOYLE     3,367,050

COMBINED PHOTOGRAPHIC CASSETTE AND VIEWING DEVICE

Filed Oct. 24, 1965

United States Patent Office 3,367,050
Patented Feb. 6, 1968

3,367,050
COMBINED PHOTOGRAPHIC CASSETTE
AND VIEWING DEVICE
Irving W. Doyle, Massapequa, N.Y., assignor to Fairchild Camera and Instrument Corporation, a corporation of Delaware
Filed Oct. 24, 1965, Ser. No. 504,683
4 Claims. (Cl. 40—86)

ABSTRACT OF THE DISCLOSURE

A combination processed-film container and viewing device for allowing processed aerial films or the like to be dropped from aircraft to ground personnel, and promptly viewed by facilities included in the device. A split cylindrical container includes a shaft for rolling processed film, and a second shaft stowed in the device permits rolling and re-rolling of film between the opened container halves and over an illuminated light-table formed of a plastic sheet supported on tilt-up arms of the container halves.

---

This invention pertains to photography, and more particularly to a combined container and viewing device for photographic materials. While the apparatus of the invention is of more general application, it has special utility in connection with the quick inspection of films that have been processed in aircraft and then ejected for retrieval by ground personnel.

Various kinds of rapid film processing have made it possible for aerial reconnaissance photographs and similar material to be made available for viewing while the aircraft is still in flight; indeed, very shortly after the film has been exposed. While such pictures are often of immediate use to those in the aircraft, there are also many situations in which it would be desirable for the pictures to be delivered very quickly to ground positions or personnel. Since time is often of the essence in those situations, it is desirable that the processed film material be available for viewing with a minimum of handling, rewinding, and similar operations.

It is accordingly a principal object of the invention to provide a container into which processed photographic film can be wound up, for example as it issues direct from a rapid processor, said container being convertible in the hands of a recipient to provide an immediate viewing facility in the nature of an illuminated light table.

A further object is to provide a container of the above type into which film or the like may be wound directly as it issues from the film processor, and which container, when opened up, will provide for rolling and re-rolling the film between two rollers or spindles, across an illuminated inspection table.

Still another object of the invention is to provide a film container as above in which all of the components needed for the conversion of the device to a viewing apparatus are housed in the container itself, for prompt utilization by properly-instructed persons.

In general, the above and other objects and advantages of the invention are attained by a container design comprising two generally semi-cylindrical container halves, hinged together so that when closed upon one another, they define a cylindrical cassette; complete with an entrance slot through which processed film can enter and be spooled, or rolled up on a spindle, by means of power applied to an external gear or sprocket wheel connected thereto. A second spindle or shaft is removably stowed inside the first (hollow) spindle, and a transparent or translucent flexible sheet is removably held in one of the container halves in a curved condition along the inner wall so as not to interfere with the spooling of film into the closed cassette. The respective container halves are also provided with folding support arms which, when swung to operative positions after the container halves have been opened up by a 180-degree relative hinged rotation thereof, will receive and support the light transmitting sheet so as to act as a table for film reeled from one of the container halves to the other. Built-in provision for transillumination of the film where it crosses the inspection table includes one or more miniature electric lamps and reflecting means, disposed along or adjacent the common hinge axis of the container sections.

The invention will now be described in detail in connection with a preferred construction given by way of example, reference being made to the appended drawings, in which.

Figure 1:
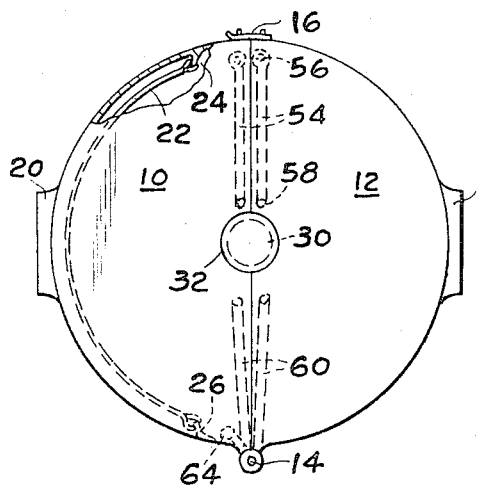
FIG. 1 is an end view of the combined cassette and viewing device, in closed condition.
Figure 2:
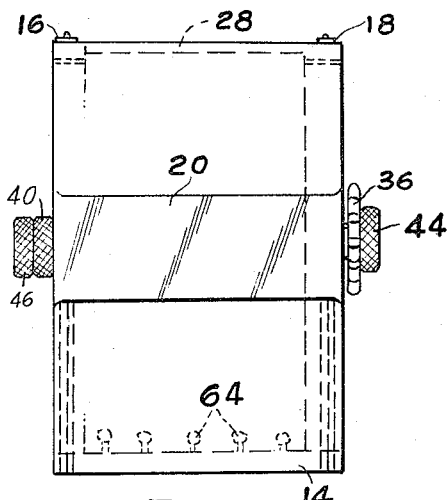
FIG. 2 is a side view of the same.

FIGS. 1 and 2 of the drawings show the device in closed condition, the respective semi-cylindrical container sections 10 and 12, hinged together as at 14, being held shut as by spring latches 16 and 18, secured at one end of one of the container halves and apertured at their other ends to engage pins on the opposite container halves. Each container section is preferably provided with a flattened boss portion 20, these forming support feet for the container sections when they have been opened up to the FIG. 3 condition.

Within one of the container sections a sheet of flexible but semi-rigid light-transmitting material 22, such as heavy-gauge cellulose acetate, preferably with a matte finish is stowed between clip formations 24, 26 which are preferably integral with the inner wall of the container section. Sheet 22 has one major dimension as great as can be accommodated between the end walls of the container, the other major dimension being so related to the positions of clips 24 and 26 that, when inserted between them, the plastic sheet will be bowed to lie along the inner semi-cylindrical wall of the container section. The sheet 22 is thus kept out of the way as processed film is spooled into the cassette; for example, through an access slot 28 located between closure clips 16 and 18.

Figure 3:
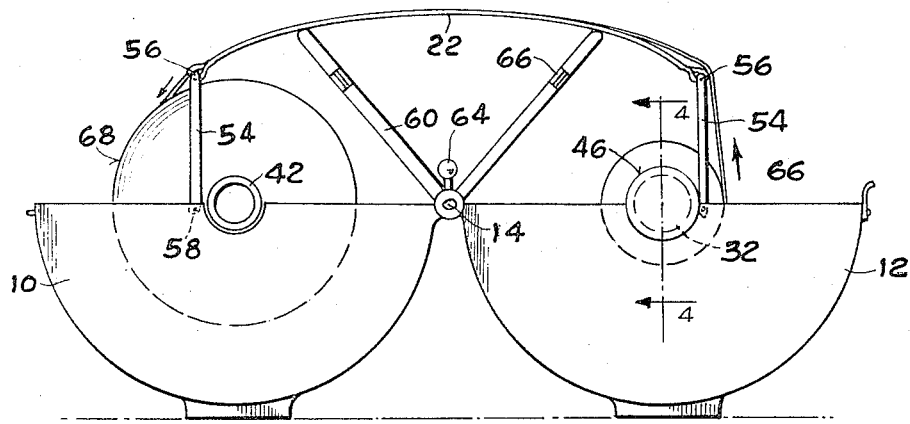
FIG. 3 is an end view, looking in the same direction as FIG. 1, but with the container halves swung apart and the light table properly supported for film inspection purposes.
Figure 4:
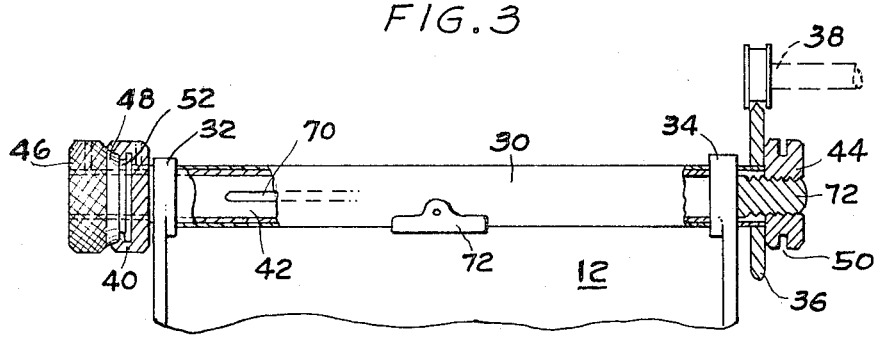
FIG. 4 is a fragmentary view to a larger scale, and partly broken away, illustrating the telescoped spooling spindle and film winding arrangements; the section plane being indicated generally by line 4—4 in FIG. 3.

The film being reeled into the cassette is rolled up around a spindle 30 journaled between disc-like bosses 32, 34 formed integral with the end walls of one container section 12 (see FIGS. 3 and 4). At one end, spindle 30 is fastened to an external sprocket wheel 36 adapted to be power driven, if desired, from the rapid film processing machine, by a conventional drive connected as indicated in dash lines at 38 in FIG. 4.

At the opposite end of spindle 30 from sprocket 36, it has secured thereto a preferably knurled operating knob 40. Spindle 30 is actually a hollow tube, which normally receives telescopically therein a second spindle 42 which may be a smaller diameter tube or shaft whose end passing beyond the open end of spindle 30 (at the sprocket wheel 36) is threaded to receive a retaining nut 44, of special characteristics to be described below. The opposite end of inner spindle 42 has secured thereto a knurled operating knob 46, conveniently having a reduced-diameter skirt portion 48 sized to fit inside a hollowed-out recess of knob 40. Both spindles are provided with clips or like known arrangements to allow film ends to be secured thereto.

The problem of providing an arrangement which will operate as a single spindle for winding film when the container sections are closed (as in FIG. 1), but providing a second spindle for use when the container sections have been opened up (as in FIG. 3), and providing convenient storage for the second spindle, is solved by the arrangement described. In order that the complementary container sections 10 and 12 may close fully upon one another, as in FIG. 1, the cylindrical bosses 32 and 34 are made integral with one of the casing sections; in particular, casing section 12 in the embodiment shown. The opposite section, 10, must have semicircular cut-outs to accommodate these bosses when the apparatus is closed up. Also, either the diameter of the semicircular cut-outs must be the same as the outer diameter of bosses 32 and 34, or of any grooved arrangement in those bosses which might be provided for additional container strength in its closed condition. In any case, the hollow semicircular cut-outs would not be of proper size nor otherwise suitable as journals or bearing elements to receive the second winding spindle 42 when the latter has been removed from its stowed position within spindle 30.

Accordingly, both the retaining nut 44 and the knob skirt 48 (FIG. 4) are given an outer diameter greater than that of the semicircular cutouts in section 10, and each is provided with a peripheral groove such as indicated at 50 and 52, these grooves being sized to fit snugly in the cutouts of section 10 when the container has been opened out to the FIG. 3 position.

Hingedly secured on the inner surface of each of the end faces of both of sections 10 and 12 are the arms 54 of respective viewing panel support rods 56. Arms 54 are pivoted at their ends nearer the container center, as at 58, and are of such length that cross-rods 56 will lie along opposite sides of the film entry path (at slot 28, FIG. 2) when the container is closed. So located, the rods are near the periphery of the interior space of the container (just as is stowed panel 22) and hence do not interfere with the winding of a considerable length of film into the container. Auxiliary panel-support arms 60 are hinged about the pintle of casing hinge 14, and also lie along the inner faces of both end walls of the container sections. At least the latter support arms, and preferably all such arms, are provided with friction means at their pivotal support points.

A source of viewing illumination is provided as by a row of tiny electric lamps 64 (or a linear filament lamp) suitably mounted alongside of hinge arrangement 14 on one of the inner casing section margins, as indicated in FIG. 3. Conventional circuit connectors and an external battery (or a long thin battery inside hinge 14) provide power for illuminating film traversed over plastic panel 22 from one spindle to the other. The extreme edges of the panel may have adjacent sections cut and plastically deformed to provide fingers adapted to snap over the cross-rods 56 of arms 54. Thus, as shown in FIG. 3, the bails formed by arms 54 and rods 56 are, of course, swung up to the FIG. 3 position when the casing sections have been unfolded, and the rods 56 connected together by the panel 22. Arms 60 are then swung up from within the casing sections to provide auxiliary intermediate supports for the edges of the plastic panel 22. If necessitated by the dimensions of the apparatus, arms 60 may be of telescopic or knuckle-jointed construction, as suggested at 66, to attain the proper length while remaining foldable within the confines of the complete container.

The operation of the invention will be largely obvious from what has been said above. The container sections are formed of light but strong metal or high impact-strength plastic, to provide adequate strength and protection of the film when the closed unit is ejected from an aircraft or otherwise subjected to rough treatment. After recovery by ground personnel, catches 16 and 18 are released, and the casing sections opened up as in FIG. 3. Auxiliary second-spindle journal element 44, which is also a threaded nut, is spun off the end of the second (inner) spindle 42, and the latter is withdrawn by pulling on its knob 46 (FIG. 4). The nut 44 is then rethreaded upon spindle 42, which is threaded for a sufficient length that, when nut 44 is jammed to its limit of inward threading motion, the grooves 50 and 52 can be fitted against the edges of the semicircular cutouts of the end walls of section 10. The end of the film wound on outer spindle 30, in container section 12, can now be guided upward as at arrow 66 in FIG. 3, thence over table panel 22, and down into section 10 where it is connected with the second spindle 42. Ultimately, as film is wound across the viewing table 22, a reel thereof as large as indicated at 68 (at the left in FIG. 3) may have been viewed. Any desired rewinding is readily accomplished by manipulation of knob 40 connected to outer spindle 30.

It is common to secure the ends of films (or leader sections) to spindles by threading them through slots in the latter. In the present case, the provision of telescoped spindles (42 within 30) makes it preferable to provide a spring clip 68 (FIG. 4) for the outer spindle 30 to avoid conflict with the inner spindle. The latter may be slotted as at 70 for film-end securement, since it is used only after removal from the larger spindle.

The end of inner spindle 42 which must be passed through spindle 30 when the former is stowed therein, may conveniently be made solid as at 72 by a plug, to provide a more solid member for threading into nut 44. If removable, plug 72 then allows the hollow spindle 42 to be used for stowing the battery intended for powering lamps 64.

While the invention has been described above in connection with a particular physical embodiment, various modifications will occur to those skilled in the art, and it is not intended to exclude such variations from the true scope of the invention, except as may be required by the language of the appended claims.

What is claimed is:

1. A photographic film-handling device convertible from a form useful primarily as a film-protective container to an alternate form providing film feeding and viewing utility, comprising:
    (a) a pair of shells providing when closed upon one another a film cassette,
    (b) a reeling spindle journaled in one of said shells to receive thereon film entering said cassette,
    (c) a light-transmitting film-inspection support sheet stowed in one of said shells,
    (d) and support arms mounted for movement to positions exterior of said shells when the latter have been opened up, said arms receiving and supporting said support sheet.

2. A device in accordance with claim 1, including a second spindle stowed within said first-mentioned spindle and removable therefrom for use as a winding spool in the other of said shells when they are in their opened condition.

3. A device in accordance with claim 1, and illuminating means carried by at least one of said shells for illuminating film lying over said support sheet.

4. A photographic film-handling device convertible from a form useful primarily as a film-protective container to an alternate form providing film feeding and viewing utility, comprising:
    (a) a pair of generally similar rigid shells each having one open face and hinged to one another so as to provide, when closed one upon the other, a film cassette, (b) a reeling spindle journaled in one of said shells to receive thereon film entering said cassette,
(c) a light-transmitting film-inspection support sheet removably stowed in one of said shells adjacent an interior wall thereof,
(d) and support arms hingedly mounted within both said shells for movement to positions exterior of said shells when the latter have been opened up through a relative angle of 180 degrees about their hinged connection, said arms in their out-folded positions receiving and supporting said support sheet.

References Cited
UNITED STATES PATENTS

| | | | |
|---|---|---|---|
| 1,443,558 | 1/1923 | Bloomfield et al. | 40—86 |
| 2,464,673 | 3/1949 | Debrie | 242—71.2 |
| 3,104,846 | 9/1963 | Ringle | 242—71.1 |

FOREIGN PATENTS 725,963  10/1942  Germany.

EUGENE R. CAPOZIO, *Primary Examiner.*
WILLIAM H. GRIEB, *Examiner.*